(12) United States Patent
Souchkov

(10) Patent No.: US 7,220,965 B1
(45) Date of Patent: May 22, 2007

(54) WARM AC BIASING IN TES MICROCALORIMETER READOUT VIA TRANSFORMER

(76) Inventor: Vitali Souchkov, 1631 N. First St., Walnut Creek, CA (US) 95112

(*) Notice: Subject to any disclaimer, the term of this patent is extended or adjusted under 35 U.S.C. 154(b) by 249 days.

(21) Appl. No.: 10/993,624

(22) Filed: Nov. 19, 2004

(51) Int. Cl.
*H01L 39/06* (2006.01)
(52) U.S. Cl. .................................... 250/336.2
(58) Field of Classification Search ............ 250/336.2, 250/336.1; 374/31
See application file for complete search history.

(56) References Cited

U.S. PATENT DOCUMENTS

| | | | |
|---|---|---|---|
| 6,211,519 B1* | 4/2001 | Nam et al. ................ | 250/336.2 |
| 6,323,486 B1* | 11/2001 | Grossman et al. ........ | 250/338.1 |
| 2002/0115572 A1* | 8/2002 | Mitsuda et al. ............. | 505/210 |
| 2003/0043879 A1* | 3/2003 | Tanaka et al. ................ | 374/31 |
| 2003/0076251 A1* | 4/2003 | Gupta et al. ................ | 341/133 |

* cited by examiner

*Primary Examiner*—Albert Gagliardi

(57) ABSTRACT

Prospective readout architecture with Transition Edge Sensor (TES) electrical biasing from the warm readout is introduced. The architecture allows building of large imaging detector arrays with TES. The invention allows an unprecedented combination of imaging and spectrometry features in one radiation detector.

9 Claims, 10 Drawing Sheets

.step param E0 list 60 120

.save V(abso) V(tabso) V(teso) I(B2) V(bia)

.tran 0 45m 0ms 0.01u uic

I=(-Gabs/Cabs)*(V(Tabso,0)-V(Tteso,0))

Tabsi  Tabso  G4  B7  I2

PULSE(0 {E0*27.1289E3} 40m 1n 1n 0.1n 1500m 1)

.params Rn=0.36 Tc=122m Ts=110m K=60.2n DeltaTc=3m Rl=10m
Gabs=1.01E-8 Cabs=9.57E-12 Ctes=9.92E-13 V0=0.7u E0=60
freq=0.917Meg pi=3.14159 coupl=1.0 Rcold=5m I=(Gabs/Ctes)*(V(Tabso,0)-V(Tteso,0))-(K/Ctes)*(V(Tteso,0)=3.417-Ts=3.417)+
(V(bia,0)**2)/Ctes/(((Rn-Rcold)/DeltaTc)*(V(Tteso,0)-Tc)*((sgn(V(Tteso,0)-Tc)+1)/2)*
((sgn(Tc+DeltaTc-V(Tteso,0))+1)/2)+Rl+Rcold+Rn*((sgn(V(Tteso,0)-Tc-DeltaTc)+1)/2))

Ttesi  Tteso  B1

V1  bia  B2    SINE(0 {V0*sqrt(2)} {freq} 0 1E-6 0 1E12)

I={V(bia,0)/(((Rn-Rcold)/DeltaTc)*(V(Tteso,0)-Tc)*((sgn(V(Tteso,0)-Tc)+1)/2)*
((sgn(Tc+DeltaTc-V(Tteso,0))+1)/2)+Rl+Rcold+Rn*((sgn(V(Tteso,0)-Tc-DeltaTc)+1)/2))}

Figure 3

WARM AC BIASING IN TES MICROCALORIMETER READOUT VIA TRANSFORMER

BACKGROUND OF THE INVENTION

The invention relates to the readout systems for transition edge sensor (TES) microcalorimeters, highly segmented arrays of microcalorimeters and cryogenic detectors possessing very high energy resolution.

TES microcalorimeters are known for their very high energy resolution that is not limited by statistics of ionization. The attempts to take full advantage of intrinsically high energy resolution and sensitivity of this type of the detector resulted in the development of rather complex electronic readout based on implementation of SQUID magnetometers. The readout becomes too complicated especially when attempts are made to develop large imaging arrays with TES References 1, 2. The realization of readout electronics in cold cryogenic temperatures used for TES operation and implementation of frequency multiplexing technique Reference 1 to readout multiple TES do not allow to overcome problems of TES detector plane overheating as well as some other limits for the readout imposed by implementation of SQUID magnetometers. Replacing SQUID with transformer allows simplification of TES readout, however biasing of TES via implementation electronic circuitry in cold cryogenic temperatures is still complicated and prevents from building large array of TES. An ability to achieve good energy resolution with transformer readout was in question until recent time because no analysis of electronic noise contribution to TES energy resolution was made for the architecture of TES readout described below.

SUMMARY OF THE INVENTION

The invented readout architecture allows TES alternating current (AC) biasing from warm front end electronics of the readout. The readout uses the transformer threefold: for TES AC biasing, for readout of TES signal, for thermal isolation of the readout active part and TES via vacuum gap between the transformer coils of the readout circuit. Exclusion of dissipative elements from the part of readout circuitry that is maintained at tens of millikelvin (cold) cryogenic temperature allows realization of large arrays of TES, the only dissipative element of an array is TES. It is shown in the analysis of the invented readout architecture that the contemporary low noise electronics maintained at substantially higher than TES temperatures (warm) allows achievement of an unprecedented energy resolution for TES without using readout via SQUID magnetometers.

BRIEF DESCRIPTION OF DRAWINGS

FIG. 3 depicts a simulation page that models Alternating Current biasing of TES with voltage source. TES parameters are given in Table I.

DETAILED DESCRIPTION OF THE INVENTION

TES Microcalorimeter Electrothermal Model

Figure 1:
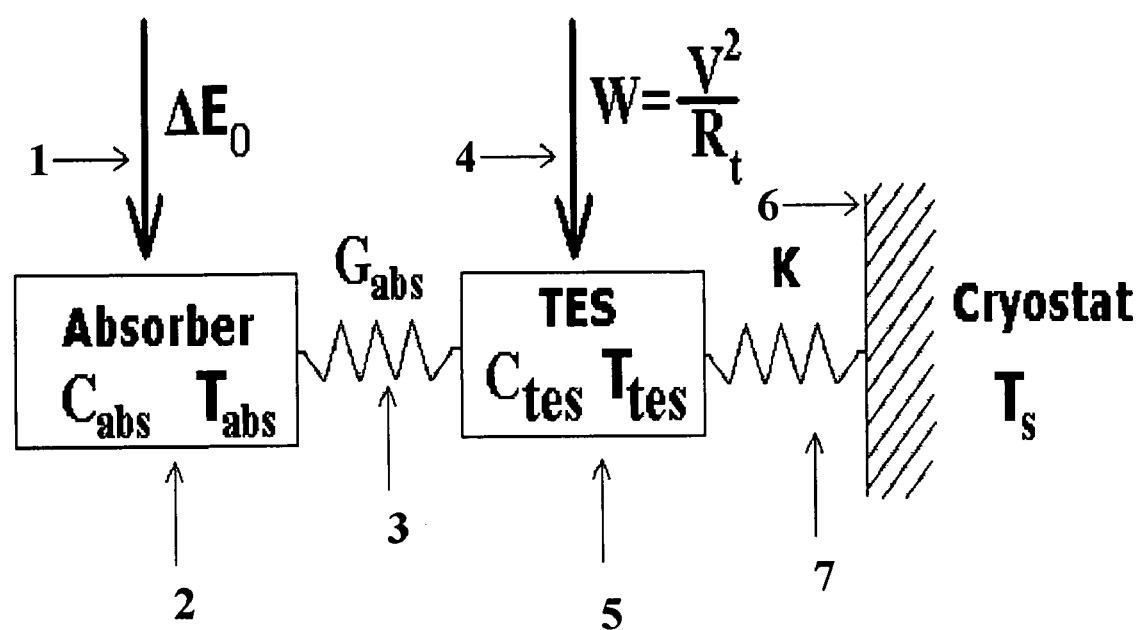
FIG. 1 depicts a TES electrothermal model. The model is described by a system of two differential equations. The parameters for the model are given in Table I.

A coherent representation of TES microcalorimeter electrothermal model could be obtained with a system of two differential equations, provided the electron-phonon interaction in the microcalorimeter is sufficiently strong Reference 3. A compound model of TES microcalorimeter involving two differential equations is shown in FIG. 1. Impinging radiation 1 deposits energy $\Delta E_0$ to the absorber 2 with heat capacity $C_{abs}$. The thermal power from the absorber is transferred to TES electrons 5 through thermal coupling 3 with thermal conductance $G_{abs}$ (TES electron-phonon interaction is considered to be very strong). The heat capacity of TES electrons $C_{tes}$ dominates over phonon heat capacity by more than two orders of magnitude as shown in Table I, therefore TES phonon heat capacity is neglected. Electric power 4 is transferred to TES electrons 5 via biasing circuit. Heat transfer from TES to cryostat 6 is done via thermal coupling 7. A system of differential equations for TES temperatures can be written as follows:

$$\frac{dT_{abs}}{dt} = -\frac{G_{abs}}{C_{abs}}(T_{abs} - T) + \frac{\Delta E_0}{C_{abs}} f(t) \qquad (1)$$

$$\frac{dT}{dt} = \frac{G_{abs}}{C_{tes}}(T_{abs} - T) - \frac{K}{C}(T^N - T_S^N) + \frac{V^2}{C_{tes}R_t}, \qquad (2)$$

where $R_t$ is TES electric resistance, T and $T_{abs}$ are temperatures of TES electrons and the absorber, V is the electric potential difference across TES, N=3.417 is coefficient for the detector involved. Function f(t) describes energy deposition shape. For instant energy deposition f(t) is equal to Dirac's delta function δ(t). The last term of expression 2 represents an instant electric power dissipated in the microcalorimeter.

In thermal equilibrium, without signal, the left part of expression 2 is equal to zero and the absorber temperature is equal to TES electron temperature. Therefore TES electron temperature at equilibrium may be expressed as follows:

$$T = \left(\frac{W}{K} + T_S^N\right)^{\frac{1}{N}}, \qquad (3)$$

where W is an electric power dissipated in the detector. The electric resistance of TES is modeled by using data extracted from Reference 4 with linear approximation of transition resistance as function of temperature. The following expression for TES electric resistance $R_t$ fits the detector data:

$$R_t = \frac{(R_N - R_C)}{\Delta T_C}(T - T_C)\Theta(T - T_C)\Theta(T_C + \Delta T_C - T) + \qquad (4)$$
$$R_C + R_l R_N \Theta(T - T_C - \Delta T_C),$$

where $R_N$, $R_C$, $R_l$ are normalization, cold and lead electric resistances correspondingly, Θ is step function, $T_C$ is transition temperature, $\Delta T_C$—transition width. The values for the parameters extracted from the detector data in Reference 4 are shown in Table I. TES current I and the voltage across TES V can be found as follows:

$$V = \sqrt{WR_p}, \quad I = \sqrt{W/R_p} \qquad (5)$$

Figure 2:
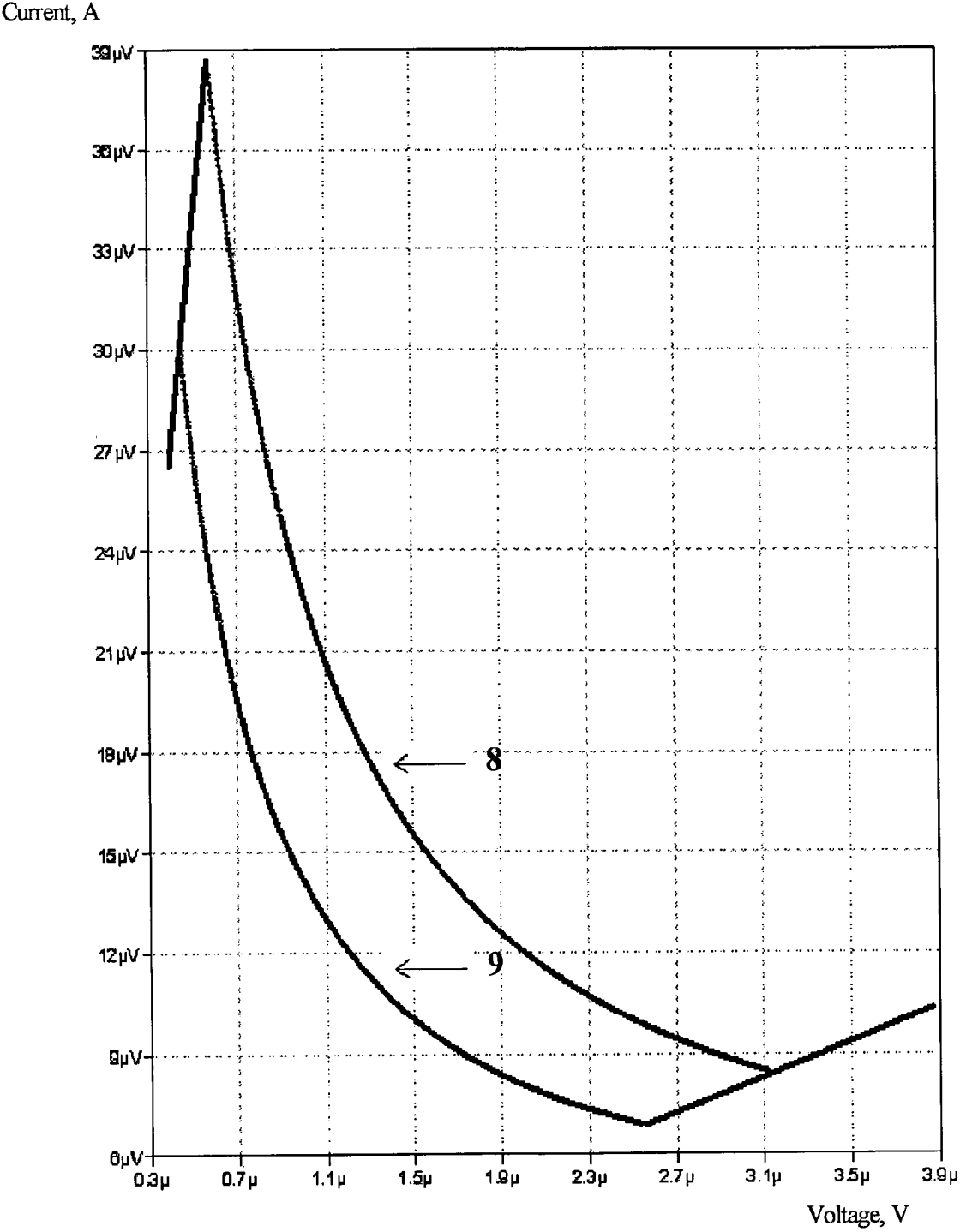
FIG. 2 depicts a TES I–V characteristics at different cryostat temperatures. The detector parameters are given in Table I and the main text. The cryostat temperatures are 100 mK and 110 mK for the upper and lower curves correspondingly.

Simulated static I–V characteristics designated as 8, 9 are presented in FIG. 2 for two cryostat temperatures 100 mK curve 8 and 110 mK curve 9. The lower plot corresponds to the higher temperature of the cryostat.

A system of differential equations 1, 2 was used to simulate electrothermal response of TES microcalorimeter in time domain. FIG. 3 shows a schematic diagram for SPICE simulations that represents TES biased by a voltage source. Two loops 10, 11 are seen at the upper part of FIG. 3 correspond to differential equations for the absorber and electron temperatures. The electric part of TES response is modeled by the behavioral current source B2 12 connected to the voltage source V1 13. The value of the current through V1 is a function of it's own voltage and electric resistance given by expression 4. The electron temperature is introduced from the loop that gives the solution of the differential equation 2. The right parts of equations 1, 2 are modeled with behavioral current sources loaded at 1Ω ideal resistors. The ideal resistors are modeled by voltage controlled current sources. The numerical equivalents of right parts of equations 1, 2 that represent temperature differentials are applied at the inputs of voltage integrators. Due to chosen simulation technique, temperature is represented in units of voltage. The realization of the voltage integrator in the frequency band of interest is done via implementation of a low pass filter. Voltage controlled current source is loaded by an ideal resistor and a capacitor connected in parallel. The following relation in the frequency domain is valid for the voltage integrator module:

$$V_{in}\frac{G_0 R}{1 + j\omega R C_0} \cong V_{in}\frac{1}{j\omega}\frac{G_0}{C_0}, \qquad (6)$$

where $G_0 = 10^{-3}$ is the transconductance coefficient, $C_0 = 10^{-3}$ F is the electric capacitance $R_0 = 10^9$ Ohm is an ideal equivalent electric resistance. With $R_0 C_0$ time constant of $10^6$ s and $G_0/C_0$ ratio equal to 1 the module represents the voltage integrator in the frequency band of interest with pole of $R_0 C_0$ low pass filter at frequency of about one over ten weeks. When simulation starts, the system evolves to establish equilibrium conditions at the temperature defined by TES parameters, temperature of cryostat and the bias voltage. Depending on the bias voltage and the cryostat temperature the equilibrium is settled at a certain point of TES I–V characteristic.

Figure 4:
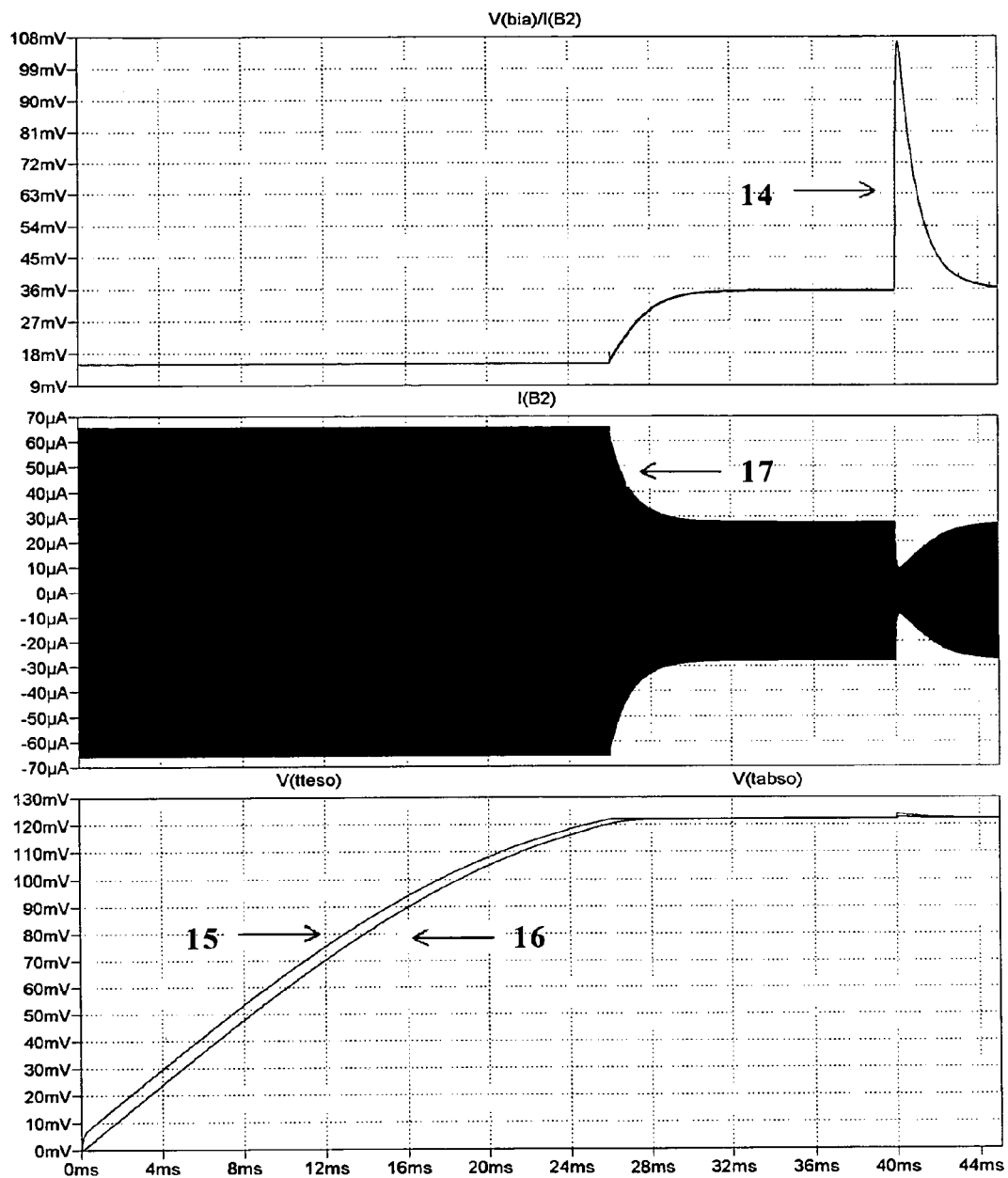
FIG. 4 depicts a settling of equilibrium conditions in AC biasing with voltage source and simulated TES response to photon absorption event.

Though TES may operate with direct current biasing, the most important applications discussed below require Alternating Current (AC) biasing of the microcalorimeter. When the AC frequency of bias source is sufficiently high the microcalorimeter response does not follow each alternation and quasi-stable operational conditions are established. The variations of TES resistance caused by radiation absorption in the detector then may be recovered by demodulation with an AC carrier. FIG. 4 shows settling of equilibrium conditions of TES with voltage AC sine wave biasing and the detector response on 60 KeV photon absorption. The amplitude of voltage bias is $V_0 = 0.7 \times \sqrt{2}$ uV at 110 mK of cryostat temperature. The upper plot shows TES resistance change in time 14, the lower plot shows TES absorber 15 and electron 16 temperatures as a function of time and the plot in the middle shows TES current change 17 in time. At zero time an AC bias of sine waveform with 917 KHz frequency is switched on. The AC bias heats the TES and in about 32 ms equilibrium conditions are settled with TES resistance of 35.24 mΩ, while initially the resistance is equal to the sum of lead and cold resistances. The settling of the equilibrium conditions is also seen in the TES current amplitude change 17 in the middle plot of FIG. 4, where dark stripe width corresponds to peak-to-peak TES current value. At 40 ms time $\Delta E_0 = 60$ KeV energy is deposited to TES absorber during 1 ns time interval. The response of TES resistance 14, current 17 and temperature changes 15, 16 caused by this signal are shown in FIG. 4 after 40 ms.

Concept of TES Readout Via Transformer

Figure 5:
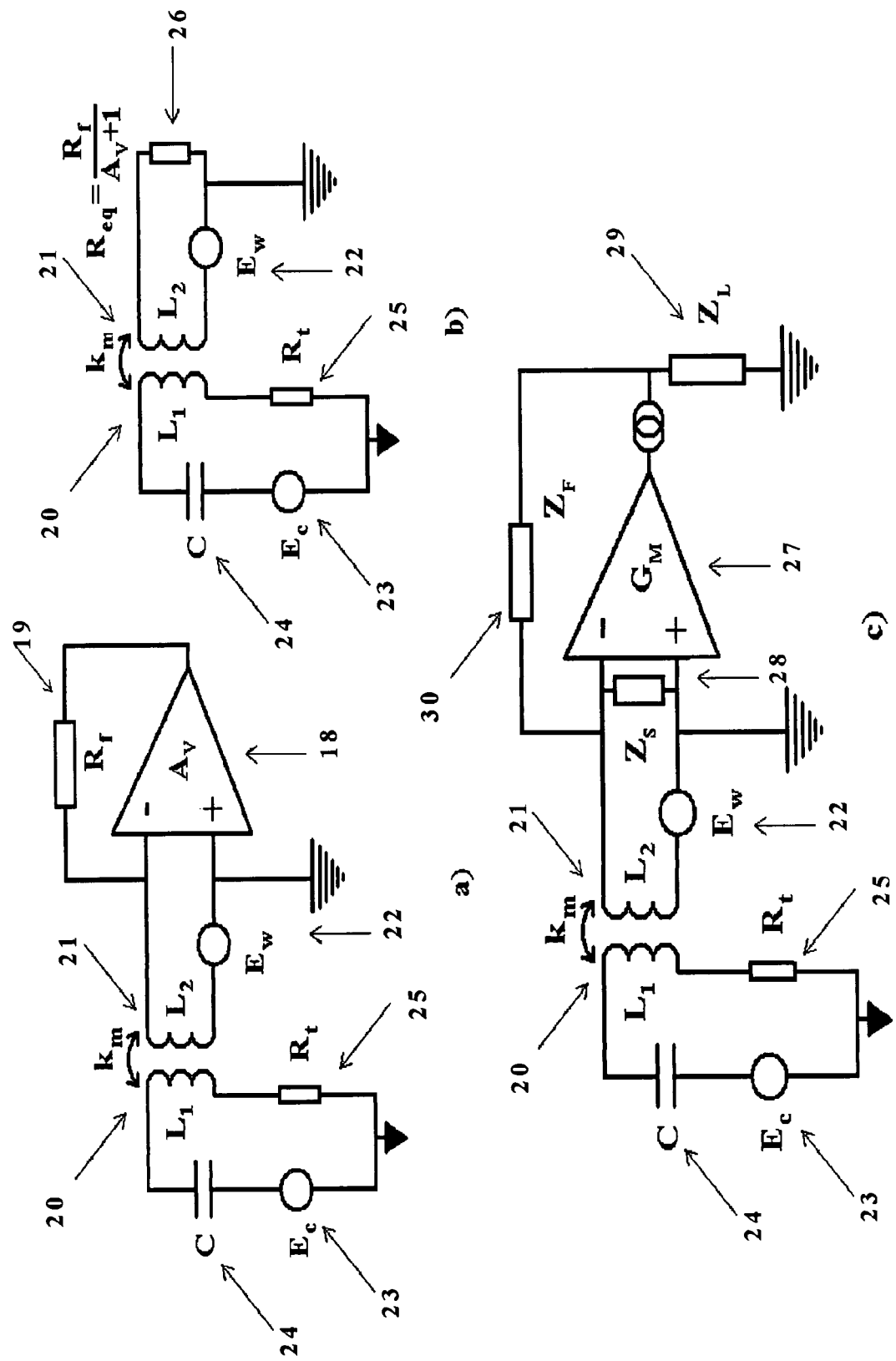
FIG. 5 depicts a principal electrical circuit of TES readout via transformer (FIG. 5a); an equivalent representation (FIG. 5b); and a more general electrical circuit for the readout (FIG. 5c).

FIG. 5 shows connection of TES to a warm readout via transformer. A voltage amplifier 18 with an open loop gain of Av and resistor Rf 19 that is connected in negative feedback model the readout front-end. The transformer primary 20 and secondary 21 coils have inductance $L_1$, $L_2$ with coupling coefficient $k_m$, where $k_m = 1$ when no magnetic flux is lost. The voltage bias may be applied in two different ways: with electromotive force (e.m.f) generator Ew connected from the warm side 22, or with e.m.f generator Ec connected from the cold side 23, as it is shown in FIG. 5. The readout circuit that also includes electric capacitor 24 and TES resistive element 25 is shown in FIG. 5a; the equivalent circuit for the analysis is shown in FIG. 5b. In the equivalent representation the input impedance of the readout electronics 26 can be written as:

$$R_{eq} = \frac{R_f}{A_V + 1} \quad (7)$$

If $I_2$ stands for an electric current of the secondary coil the voltage at the amplifier output can be expressed as follows:

$$V_{out} = -I_2 R_f \quad (8)$$

However, the readout response described in expression 8 can be used as a useful practical simplification. In a more realistic consideration, stray impedance of an input connection, parasitic capacitance of the feedback and load impedance have to be taken into account as well as an amplifier 27 with transconductance $G_M$ has to be introduced instead of an ideal voltage amplifier (see FIG. 5c). If $Z_S$, $Z_L$, $Z_F$, represent stray impedance 28, load impedance 29 and feedback impedance 30 then an equivalent input impedance and the output voltage are expressed as follows:

$$Z_{eq} = \frac{Z_S \| (Z_L + Z_F)}{1 + G_M \frac{Z_S Z_L}{Z_S + Z_L + Z_F}}, \quad (9)$$

$$V_{out} = \quad (10)$$
$$I_2 \frac{Z_S Z_L}{Z_S + Z_L + Z_F} \left(1 - G_M \frac{(Z_S + Z_F)(Z_L + Z_F)}{(Z_S + Z_L + Z_F)\left(1 + G_M \frac{Z_S Z_L}{Z_S + Z_L + Z_F}\right)}\right)$$

Parallel impedance connection symbol ∥ is used to keep expression 9 in a short form. Convergence of equations 9, 10 to 7, 8 for a simple modeling is rather evident; the substitute $A_V = G_M Z_L$ should be used. The most general condition to be assumed below is that the open loop gain of the amplifier is equal to Av at the vicinity of series resonance frequency of the primary loop.

To clarify physical principles of the readout operation in the frame of a simple model, a voltage amplifier with a feedback resistor will be considered. Contribution of stray impedance and frequency dependence of open loop gain transfer function to the readout operation can be understood after basic principle of operation is established. A system of differential equations describing electrical properties of the simplified readout can be written as:

$$I_1 R_t + \int \frac{I_1 dt}{C} = E_C + M_{12} \frac{dI_2}{dt} - L_1 \frac{dI_1}{dt} \quad (11)$$

$$I_2 R_{eq} = E_W + M_{21} \frac{dI_1}{dt} - L_2 \frac{dI_2}{dt}, \quad (12)$$

where left parts of equations 11, 12 represent electric potential difference in primary and secondary loops, the right part—sums of e.m.f The mutual inductances $M_{12}$, $M_{21}$ have following expressions:

$$M_{12} = M_{21} = M = k_m \sqrt{L_1 L_2} \quad (13)$$

Generally, a stray capacitance of the transformer coils, as well as coil cross coupling capacitance have to be introduced. Self-resonance of spiral micro-coils to be used for realization of the readout involved typically has a value of several GHz. Therefore coil stray capacitance is not important for the operation in MHz frequency band. With the detector surface of 1 mm$^2$ the capacitive cross coupling of primary and secondary coils through vacuum gap may be insignificant at MHz frequencies. In the numerical simulation described below an introduction of parasitic elements is straightforward and does not require the model elaboration while the microcalorimeter impedance behavior is already described in the model.

To obtain electric currents in primary and secondary loops in the linear approximation, the value of $R_t$ is kept constant. From equations 11, 12 the following expressions for complex amplitudes (denoted by zero subscript) are obtained:

$$-I_{10} i\omega k \sqrt{L_1 L_2} + I_{20}(R_{eq} + i\omega L_2) = E_{W0} \quad (14)$$

$$I_{10}\left(R_t + \frac{1}{i\omega C} + i\omega L_1\right) - I_{20} i\omega k \sqrt{L_1 L_2} = E_{C0} \quad (15)$$

AC biasing from cold and warm side may be considered separately by zeroing amplitude of bias at an opposite side of the circuit.

AC biasing with primary loop of the transformer operating in series resonance is implemented in frequency multiplexing technique. The resonance frequency is the system property that is independent of the e.m.f applied. The condition for series resonance in the primary loop is that the impedance has zero imaginary part. This may be expressed as follows:

$$\text{Im}\left(R_t + \frac{1}{i\omega C} + i\omega L_1 + \frac{\omega^2 k^2 L_1 L_2}{R_{eq} + i\omega L_2}\right) = 0, \quad (16)$$

where Im stands for imaginary part. Because of this condition the following expression for the resonance frequency $\omega_R$ is obtained:

$$\omega_R^2 = \beta\left(\sqrt{1 + 4\frac{R_{eq}^2 L_2^2 \omega_0^2 (1 - k^2)}{(R_{eq}^2 - L_2^2 \omega_0^2)^2}} - 1\right), \quad (17)$$

where $\omega_0$ and $\beta$ may be determined from relations:

$$\omega_0^2 = \frac{1}{L_1 C}, \beta = \frac{R_{eq}^2 - \omega_0^2 L_2^2}{2L_2^2(1-k^2)} \quad (18)$$

At the second order approximation expression 17 may be simplified to the following one:

$$\omega_R^2 \cong \frac{\omega_0^2}{1-\omega_0^2 \frac{L_2^2}{R_{eq}^2}}\left(1 - \frac{(1-k^2)\left(\frac{\omega_0 L_2}{R_{eq}}\right)^2}{2\left(1-\left(\frac{\omega_0 L_2}{R_{eq}}\right)^2\right)^2}\right) \quad (19)$$

At resonance frequency the impedance connected to the voltage source in the primary loop is expressed as follows:

$$Z_R = R_t + R_{eq}\frac{\omega_R^2 k^2 L_1 L_2}{R_{eq}^2 + \omega_R^2 L_2^2} \cong R_t + \frac{\omega_0^2 k^2 L_1 L_2}{R_{eq}} \quad (20)$$

By substituting the first order approximation for the resonance frequency in expression 20 the impedance at resonance frequency may be represented as follows:

$$Z_R \cong R_t + \frac{k_m^2 n^2 L_1}{R_{eq} C}, \quad (21)$$

where n is secondary to primary coil turn ratio. Therefore large equivalent input resistance of the readout and small characteristic (wave) impedance of the primary coil are beneficial in obtaining deep carrier modulation. The impedance of the transformer that is seen from the amplifier input is designated $Z_i$. It may be calculated from system of equations 14, 15 assuming $R_{eq}$ and $E_{W0}$ are equal to zero one at a time and dividing the potential difference by current given at above conditions. The impedance at resonance frequency is expressed as follows:

$$Z_i = i\omega L_2 + \frac{\omega^2 k_m^2 L_1 L_2}{R_t + \frac{1}{i\omega C} + i\omega L_1} \cong i\omega_0 L_2 + \frac{\omega_0^2 k_m^2 L_1 L_2}{R_t} = \quad (22)$$

$$in^2 \sqrt{\frac{L_1}{C}} + \frac{k_m^2 n^2 L_1}{R_t C}$$

It is clear from expression 22 that the impedance $Z_i$ has local maximum at resonance frequency therefore, minimizing the transfer function of noise voltage $e_n$ to the amplifier output node at that frequency.

The transformation of $e_n$ to the amplifier output node is calculated as follows:

$$V_{EN} = \frac{e_n}{\frac{Z_i}{Z_i + Z_F} + \frac{1}{A_V}} \approx e_n A_V \left(1 - \frac{Z_i}{R_{eq}}\right), \quad (23)$$

where $V_{EN}$ is the square root of the noise spectral density at the amplifier output given by series noise, $R_{eq} >> Z_i$. Similarly the noise component given by parallel noise at the output of the amplifier is found:

$$V_{IN} = -i_n R_F \frac{Z_i}{Z_i + R_{eq}} \cong -i_n Z_i A_V \quad (24)$$

For the most of practical cases with JFET front-end, the parallel noise contribution is negligible because of high ratio of $(e_n/i_n)$ to $Z_i$.

It is easy to show that electromotive force generator switched in the secondary coil loop may produce same thermal effect at resistor $R_t$ as similar generator in primary loop, when the following relation between their amplitudes is true:

$$E_{W0} = \quad (25)$$

$$\frac{E_{C0}(\omega_0^2 k_m^2 L_1 L_2 + R_t(R_{eq} + i\omega L_2))}{ik_m \omega_0 \sqrt{L_1 L_2}\left(R_t + \frac{k_m^2 \omega_0^2 L_1 L_2}{R_{eq}}\right)} \cong \frac{E_{C0} R_{eq}}{ik_m \omega_0 \sqrt{L_1 L_2}} = \frac{E_{C0} R_{eq}}{ik_m n \sqrt{\frac{L_1}{C}}}$$

Expression 25 shows that millivolt biasing from the warm side can be thermally equivalent to micro-volt biasing at cold thus keeping equal TES operational conditions at typical circuit parameters. This is an additional merit of using transformer because no biasing circuitry in cold is required. Therefore power dissipation in cold is limited to the one given by TES itself. For biasing from the warm side, the demodulation signal has to be shifted by $-\pi/2$ in phase with respect to modulation signal with biasing at cold.

Figure 6:
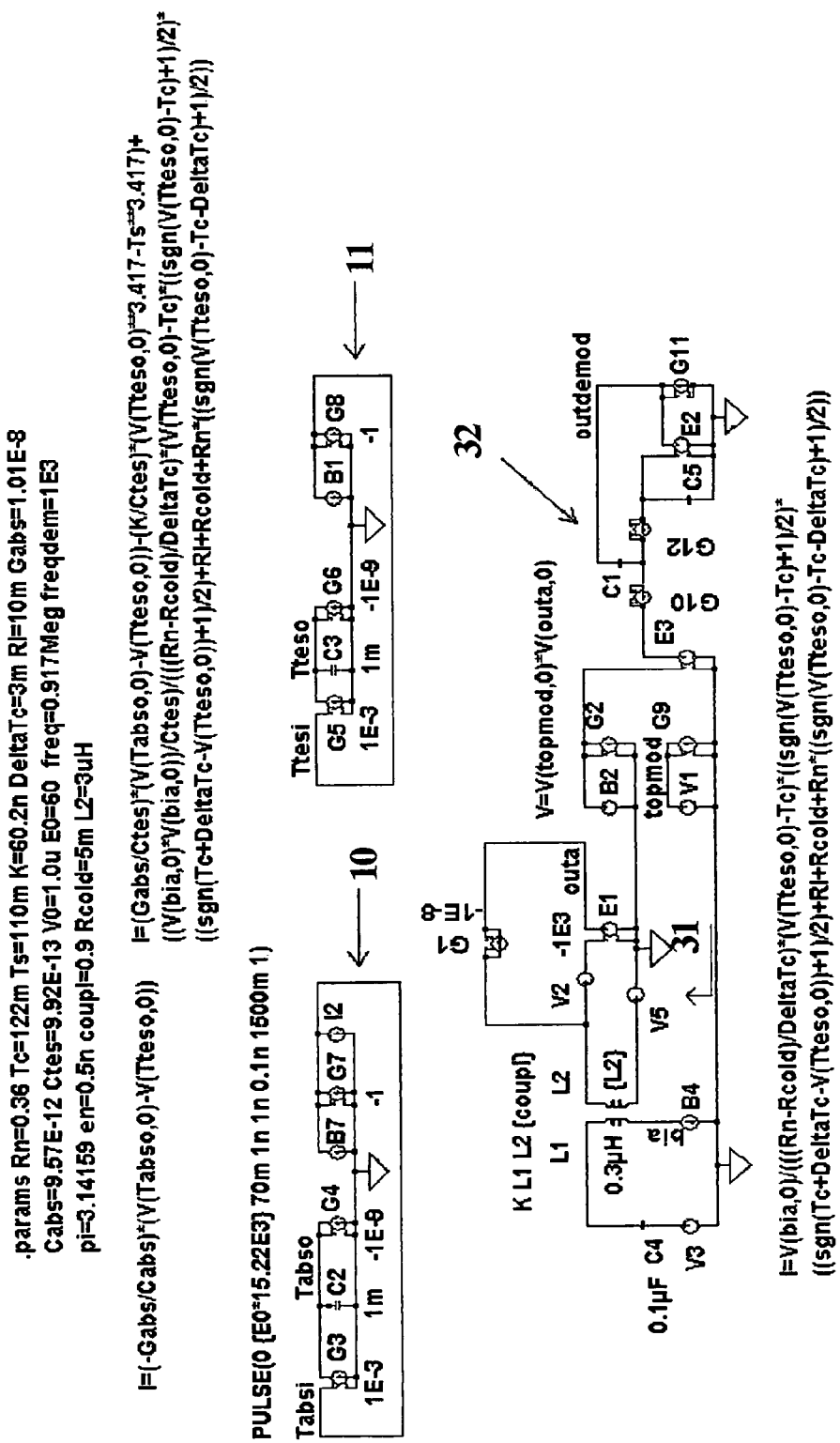
FIG. 6 depicts a simulation page for modeling of TES readout coupled to a warm amplifier via transformer. The upper loops in the Figure simulate temperature responses of TES as it was described in FIG. 3. The lower part of the Figure shows the readout front-end that corresponds to the circuit in FIG. 5a. The readout front-end is followed by the demodulator and filter of the demodulated signal. Voltage sources V3 and V5 are used to model TES biasing from cold and warm sides of the circuit. Voltage source V2 models an equivalent generator of series noise. Voltage amplifier with gain of 1000 is modeled via voltage controlled voltage source E1. An ideal feedback resistor of 100 MOhm is modeled via voltage controlled current source GI.
Figure 7:
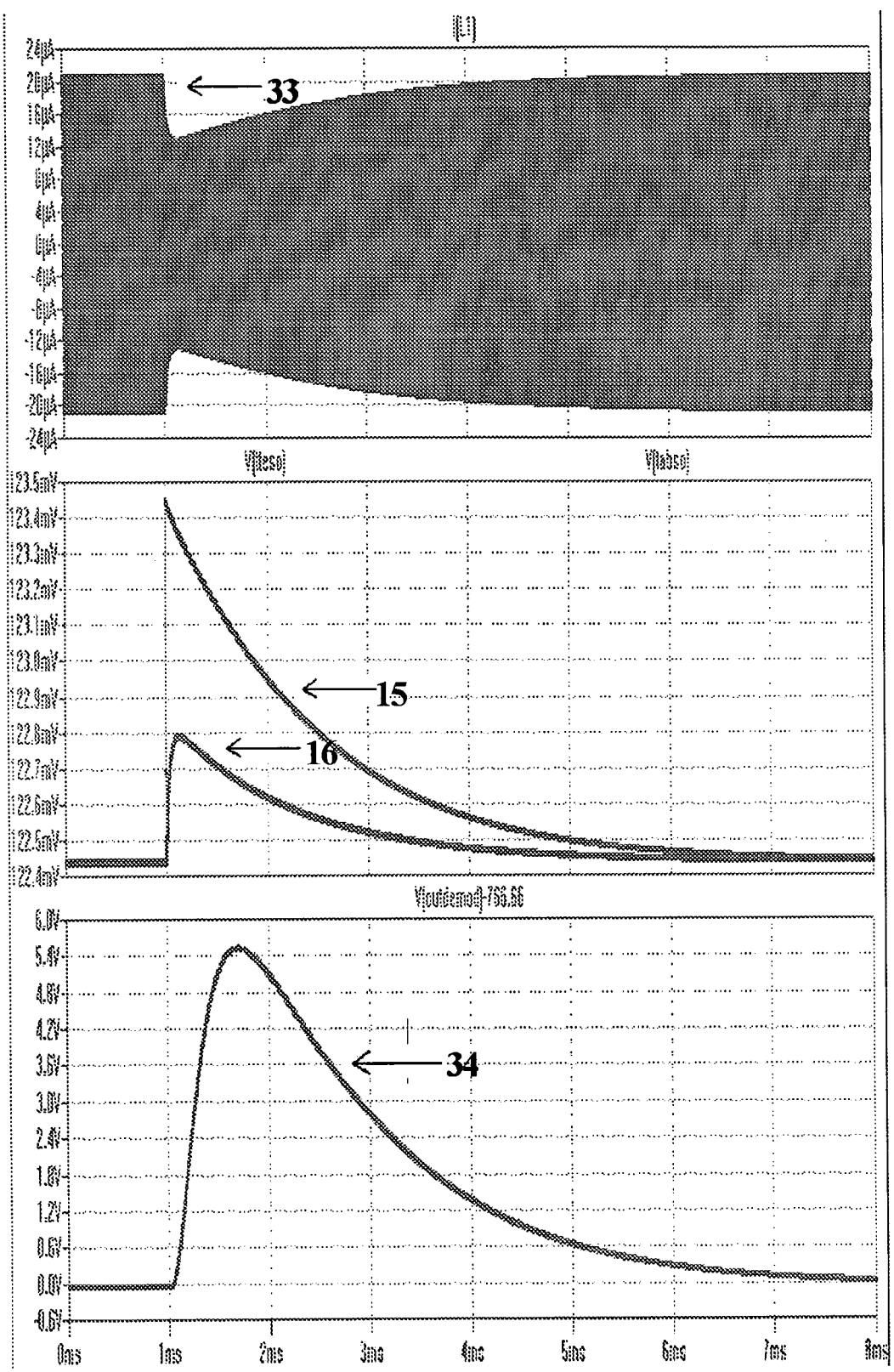
FIG. 7 depicts TES temperatures, the transformer primary coil current and demodulated signal responses to 60 KeV photon absorption event, shown for TES readout via transformer with warm AC biasing.

FIG. 6 shows simulation page for TES readout coupled to a warm amplifier via transformer. The detector biasing from the warm readout side by the sine wave voltage source 31 at resonance frequency of 917 KHz is implemented. The sine wave biasing at cold with $\sqrt{2}$ uV amplitude is equivalent to $7.85 \times \sqrt{2}$ mV amplitude of biasing from warm side for the circuit parameters shown in the FIG. 6. This result is in agreement with expression 25. The demodulation circuit includes Sallen-type low pass second order filter 32 with time constant of 0.159 ms. The readout response to 60 KeV photon absorption for the warm biasing is shown in FIG. 7. TES temperatures 15, 16 and current 33 changes in the transformer primary coil as well as the output signal 34 are shown in this figure. A brief explanation of noise to signal ratio calculation after signal demodulation is given in Appendix A. To emulate series noise, a voltage pulse generator producing small sharp pulse is switched at circuit nodes that correspond to its location. The amplitude of the pulse from this generator is referenced to the noise spectral density of the amplifier. After signal demodulation the square of the "noise waveform" given by the above stimulus is integrated to get noise power at the output. Therefore, the standard deviation in amplitude measurements of the response caused by electronic noise is obtained at the ultimate circuit output without addressing the details of circuitry.

Figure 8:
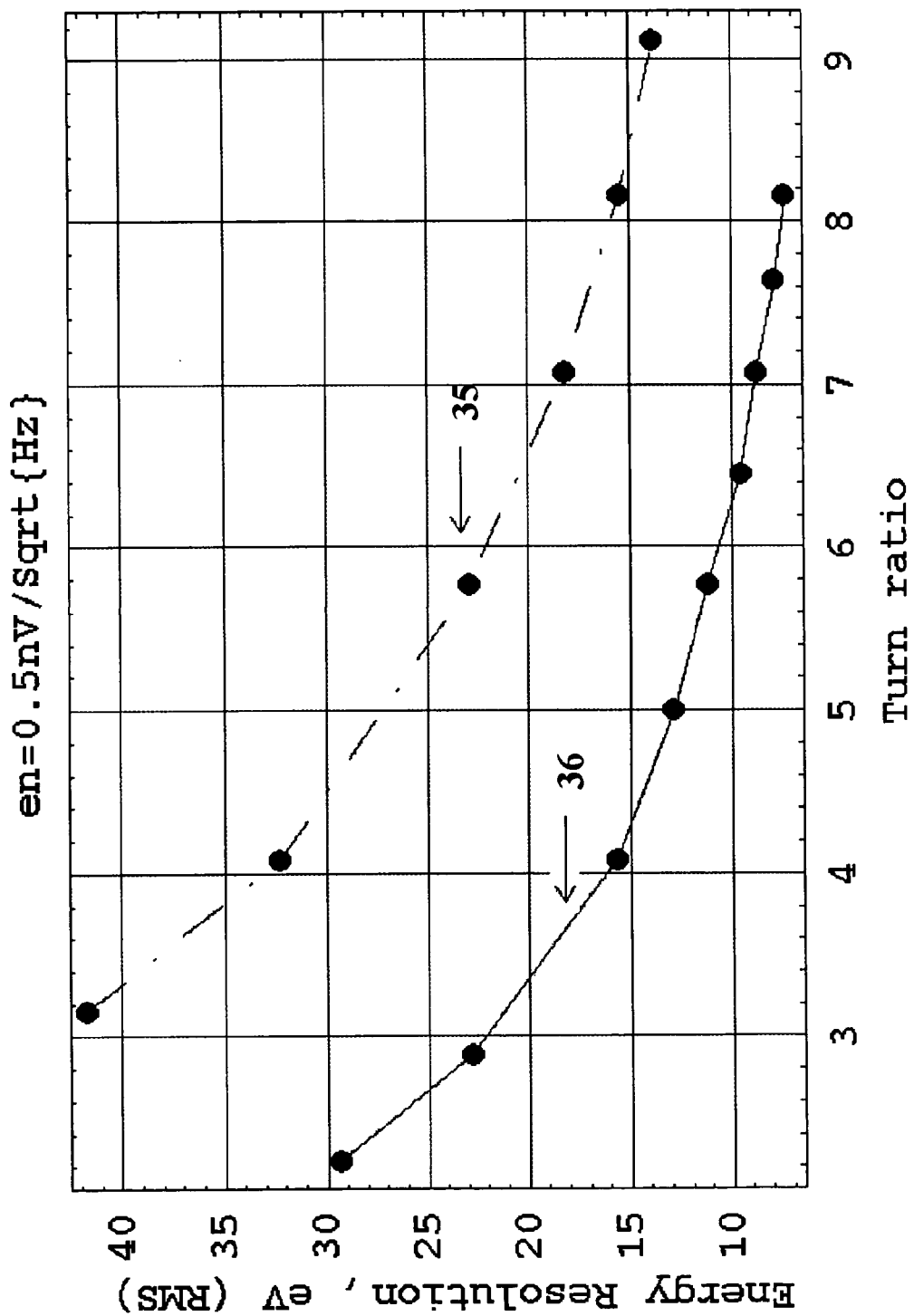
FIG. 8 depicts a SPICE simulated electronic noise energy equivalent in function of the transformer turn ratio. Two TES readout configurations with identical resonance frequencies and different characteristic impedance of the resonance circuit are simulated. The upper 35 and the lower 36 curves have the primary loop inductance and capacitance as follows: $L_1=0.3$ uH, $C=0.1$ uF and $L_1=0.6$ uH, $C=0.05$ uF; the resonance frequency stays the same. An equivalent impedance of the readout part connected to the transformer ($R_{eq}$) is equal to 100 K.

Simulated warm readout electronic noise contribution to TES energy resolution is shown in FIG. 8. The chosen readout series noise spectral density of $e_n$=0.5 nV/$\sqrt{Hz}$ corresponds to the state of the art contemporary front-end electronic noise. Two plots of noise induced dispersion simulated with different realistic parameters of the readout are presented. The larger the characteristic (wave) impedance of primary loop and the transformer turn ratio the lower the noise induced dispersion. For the simulation results presented in FIG. 8 the amplitude of biasing at sensor is maintained constant. The upper curve 35 corresponds to twice lower characteristic impedance than the lower curve 36. It is clear that for the state of the art readout electronics the noise contribution to TES energy resolution of 10 eV (RMS) or less can be achieved with realistic circuit parameters and non-optimized X-ray detector. The simplicity of warm AC biasing is an attractive feature that is accompanied by noise performance improvement. The carrier amplitude stability and noise requirements are easier to achieve with warm biasing. All of the above mentioned makes warm AC biasing extremely attractive for imaging detectors building with TES where the problem of the detector plane overheating can limit the number of elementary sensors.

Analytic Calculation of Electronic Noise Contribution to TES Energy Resolution

Electronic noise contribution to TES energy resolution can be calculated analytically in linear approximation as it will be discussed below. First calculate signal and noise at the amplifier output. When both noise and signal are calculated at the amplifier output, the influence of demodulation and filtering on noise to signal ratio may be easily understood. The signal amplitude at the amplifier output $\Delta V_{outa}$ caused by energy deposition $\Delta E_0$ in TES absorber may be expressed by using the following disentangling:

$$\frac{\Delta V_{outa}}{\Delta E_0} = -R_F \frac{\Delta I_2}{\Delta R_t}\left(\frac{\Delta R_t}{\Delta T}\frac{T}{R_t}\right)\frac{R_t}{T}\frac{\Delta T}{\Delta E_0} = -R_F \frac{\Delta I_2}{\Delta R_t}\alpha \frac{R_t}{T}\frac{\Delta T}{\Delta E_0} \quad (26)$$

The derivative of secondary coil current over TES electric resistance describes electronic response of the circuit while TES temperature derivative over energy describes electrothermal response of the microcalorimeter; α is thermal coefficient of electric resistance. For the linear approximation both responses can be obtained by solving systems of differential equations separately. Having known signal shape and noise spectral density at the amplifier output at the vicinity of carrier frequency the demodulation and filtering of both is easily calculated. Therefore electronic noise contribution to TES energy resolution can be calculated as follows:

$$\sigma(E) = \frac{\sigma_N}{\left(\frac{\Delta V_{OUT}}{\Delta E_0}\right)_{peak}}, \quad (27)$$

where standard deviation for the noise distribution ($\sigma_N$) and peak of signal response (denominator of expression 27) are obtained after filtering that follows the demodulation. First order low pass filter will be assumed for the demodulated signal in the calculation.

The derivative of TES temperature over energy can be obtained by considering small temperature variations in system of differential equations 1, 2. The following system of equations is obtained:

$$\frac{d\Delta T_{abs}}{dt} = -\frac{G_{abs}}{C_{abs}}(\Delta T_{abs} - \Delta T) + \frac{\Delta E_0}{C_{abs}}\delta(t) \quad (28)$$

$$\frac{d\Delta T}{dt} = \frac{G_{abs}}{C_{tes}}(\Delta T_{abs} - \Delta T) - \frac{1}{C_{tes}}\left(\frac{KN}{T}T^N + \frac{W\alpha}{T}\right)\Delta T \quad (29)$$

where W is quasi-equilibrium electric power dissipated in the microcalorimeter without signal; the temperature coefficient of TES resistance variation α is introduced from expression 26.

Physical solution for system of equations 28, 29 under initial condition of instant energy deposition in TES absorber at zero time is derived in Appendix B. This solution may be represented as follows:

$$\Delta T = \frac{\Delta E_0}{C_{tes}D\left(\frac{\tau_a}{\tau_e}-1\right)}\left[\exp\left(-t\left(\frac{1}{\tau_0}-\frac{D}{\tau_1}\right)\right) - \exp\left(-t\left(\frac{1}{\tau_0}+\frac{D}{\tau_1}\right)\right)\right], \, t \geq 0 \quad (30)$$

$$\Delta T_{abs} = \frac{\Delta E_0}{2C_{abs}}\left[\left(1+\frac{1}{D}\right)\exp\left(-t\left(\frac{1}{\tau_0}-\frac{D}{\tau_1}\right)\right) + \left(1-\frac{1}{D}\right)\exp\left(-t\left(\frac{1}{\tau_0}+\frac{D}{\tau_1}\right)\right)\right], \, t \geq 0 \quad (31)$$

where constants $\tau_0$, $\tau_1$, D are defined in appendix B. If TES absorber and TES electron temperatures decay time constants are defined as:

$$\tau_a = \frac{C_{abs}}{G_{abs}}, \quad (32)$$

$$\tau_e = \frac{C_{tes}}{G_{abs} + KNT^{N-1} + \frac{\alpha}{T}W},$$

then under condition $\tau_a \gg \tau_e$ the temperature responses of TES may be simplified to the following ones:

$$\Delta T \cong \frac{\Delta E_0}{C_{tes}}\frac{\tau_e}{\tau_a}\left(\exp\left(-\frac{t}{\tau_a}\right) - \exp\left(-\frac{t}{\tau_e}\right)\right), \, t \geq 0 \quad (33)$$

$$\Delta T_{abs} \cong \frac{\Delta E_0}{C_{abs}}\exp\left(-\frac{t}{\tau_a}\right), \, t \geq 0 \quad (34)$$

Electronic response of the readout system may be calculated by solving system of differential equations for small changes of currents caused by variation of TES resistance. The equations for these small changes can be obtained from system of equations 11, 12 as follows:

$$R_t\left(\frac{\Delta I_1}{\Delta R_t}\right) + I_1 + \frac{1}{C}\int\left(\frac{\Delta I_1}{\Delta R_t}\right)dt = M_{12}\frac{d}{dt}\left(\frac{\Delta I_2}{\Delta R_t}\right) - L_1\frac{d}{dt}\left(\frac{\Delta I_1}{\Delta R_t}\right) \quad (35)$$

$$R_{eq}\left(\frac{\Delta I_2}{\Delta R_t}\right) = M_{21}\frac{d}{dt}\left(\frac{\Delta I_1}{\Delta R_t}\right) - L_2\frac{d}{dt}\left(\frac{\Delta I_2}{\Delta R_t}\right), \quad (36)$$

The solution for this system of differential equations can be found in frequency domain by using usual substitutes:

$$\frac{\Delta I_1}{\Delta R_t} = X_{10} e^{i\omega t}, \frac{\Delta I_2}{\Delta R_t} = X_{20} e^{i\omega t} \quad (37)$$

The solutions for complex amplitudes $X_{10}$, $X_{20}$ are found to be:

$$X_{10} = \frac{-I_1}{R_t + \frac{1}{i\omega C} + i\omega L_1 + \frac{\omega^2 M_{12} M_{21}}{R_{eq} + i\omega L_2}} = \quad (38)$$

$$\frac{-E_{C0}}{\left(R_t + \frac{1}{i\omega C} + i\omega L_1 + \frac{\omega^2 M_{12} M_{21}}{R_{eq} + i\omega L_2}\right)^2}$$

$$X_{20} = \frac{i\omega M_{12}}{R_{eq} + i\omega L_2} X_{10} \quad (39)$$

Under operational conditions of series resonance the following simplification for the carrier amplitude $X_{20}$ is valid:

$$X_{20} = \frac{i\omega_0 M_{12}}{R_{eq} + i\omega_0 L_2} \frac{-E_{C0}}{\left(R_t + \frac{R_{eq}\omega_0^2 M_{12} M_{21}}{R_{eq}^2 + \omega_0^2 L_2^2}\right)^2} \approx \frac{i\omega_0 M_{12}}{R_{eq}} \frac{(-E_{C0})}{R_t^2} = \quad (40)$$

$$-i\frac{k_m n E_{C0}}{R_{eq} R_t^2}\sqrt{\frac{L_1}{C}}$$

The resonance width estimated through expression:

$$\Delta f_0 = \frac{1}{2\pi}\frac{R_t}{2L_1} \quad (41)$$

is much larger than the bandwidth of the demodulated signal for typical circuit parameters. Therefore the noise power after demodulation can be expressed as follows:

$$\sigma_N^2 = c^2\int_0^\infty \frac{V_{EN}^2}{1+(\omega\tau_F)^2}df = \frac{1}{2\pi\tau_F}c^2\int_0^\infty \frac{V_{EN}^2}{1+x^2}dx = \quad (42)$$

$$\frac{1}{2\pi\tau_F}c^2 V_{EN}^2 \frac{\pi}{2} = \Delta f_F c^2 e_n^2 A_V^2 \left(1 - \frac{Z_i}{R_{eq}}\right)^2 \frac{\pi}{2},$$

where c—constant of demodulated signal amplitude scaled with carrier amplitude (will be cancelled in noise to signal ratio calculation), $\tau_F$—filter time constant of demodulator, $\Delta f_F$—frequency band associated with the filter time constant.

The demodulated signal shape is obtained via convolution of TES temperature response described by expression 30 (simplified in expression 33) with impulse characteristic of the demodulated signal filter. For the first order low pass filter with time constant $\tau_F$ this response is derived via expression 33 as follows:

$$\Delta T \cong \frac{\Delta E_0}{C_{tes}}\frac{\tau_e}{\tau_a}\left(\frac{\exp\left(-\frac{t}{\tau_a}\right) - \exp\left(-\frac{t}{\tau_F}\right)}{1 - \frac{\tau_F}{\tau_a}} - \frac{\exp\left(-\frac{t}{\tau_e}\right) - \exp\left(-\frac{t}{\tau_F}\right)}{1 - \frac{\tau_F}{\tau_e}}\right) \quad (43)$$

The most common practical applications require $\tau_a \gg \tau_F \gg \tau_e$. Under above conditions the electron temperature reaches peak at a time:

$$t_{max} \cong \tau_F \ln\left(\frac{\tau_F}{\tau_a}\right) \quad (44)$$

Therefore TES electron temperature at maximum is expressed as follows:

$$\Delta T_{max} \cong \frac{\Delta E_0}{C_{tes}}\frac{\tau_e}{\tau_a}\left(\left(\frac{\tau_F}{\tau_a}\right)^{\frac{\tau_F}{\tau_a}} - \frac{\tau_F}{\tau_a}\right) \quad (45)$$

Having known the transfer function for the signal at carrier frequency (expression 40), TES peak electron temperature (expression 45) and electronic noise power at the demodulator output (expression 42) an energy equivalent of electronic noise is derived from expression 27 as follows:

$$\sigma(E) \cong \frac{e_n C_{tes} T}{2\sqrt{\tau_F} E_{C0} k_m n\alpha}\frac{R_t}{\sqrt{L_1/C}}\frac{\tau_a}{\tau_e\left(\left(\frac{\tau_F}{\tau_a}\right)^{\frac{\tau_F}{\tau_a}} - \frac{\tau_F}{\tau_a}\right)} \quad (46)$$

where not all of the variables in expression 46 are independent. TES temperature may be found via expression 3, when electric power dissipated in microcalorimeter is known. At resonance frequency the impedance in primary loop is given by expression 21, therefore the electric power dissipated in TES is expressed as follows:

$$W = \frac{E_{CO}^2 R_t}{2\left(R_t + \frac{k_m^2 n^2 L_1}{R_{eq}C}\right)^2} \quad (47)$$

Then TES electron temperature may be found from expression 3 as follows:

$$T = \left(\frac{E_{CO}^2 R_t}{2K\left(R_t + \frac{k_m^2 n^2 L_1}{R_{eq}C}\right)^2} + T_S^N\right)^{\frac{1}{N}} \quad (48)$$

Expression 48 together with expression 4 for TES electric resistance are forming system of equations from which TES electron temperature and electric resistance may be unambiguously obtained (at least numerically). If TES electron temperature is calculated then temperature coefficient of electric resistance may be found from the expression:

$$\alpha = \left(\frac{R_N}{R_t} - 1\right)\frac{T}{T_N - T} \quad (49)$$

TES electron temperature and temperature coefficient of electric resistance have to be substituted in expression 32 to derive TES electron time constant. Therefore, all variables in 46 can be expressed via the detector parameters, circuit parameters and the amplitude of bias carrier. When bias is applied from the warm side the amplitude in expression 48 has to be replaced by warm bias amplitude using expression 25. The same bias amplitude substitute has to be used in expression 47 for an electric power. For an application that targets high energy resolution, TES temperature is kept close to transition temperature $T_C$, that was also the case for simulations results shown in FIG. 8. If TES temperature equal to the transition temperature (to the first approximation), TES electric resistance can be expressed as follows:

$$R_t = \frac{E_{CO}^2}{2K(T_C^N - T_S^N)}, \quad T = T_C \quad (50)$$

It is clear that a very large demodulated signal filter time constant is not beneficial in achieving good energy resolution. From the other hand electronic noise contribution to TES energy resolution is large for a very small filter time constant too. If one chooses a filter constant $\tau_F$ equal to the absorber time constant $\tau_a$ then the amplitude of the detected signal is about e≈2.78 times smaller of that with very fast demodulation filter. Therefore estimation of electronic noise energy equivalent for a demodulation filter with time constant equal to the absorber time constant can be expressed as follows:

$$\sigma(E) \cong \frac{e_n C_{tes} T}{E_{CO} k_m n \alpha} \frac{R_t}{\sqrt{L_1/C}} \frac{e}{2} \frac{\sqrt{\tau_a}}{\tau_e} \quad (51)$$

The unit for energy resolution in expressions 46, 51 is Joule. Expression 51 is very useful in researching different ways to improve the energy resolution. Indeed expression 51 shows that higher quality factor of the resonance, larger transformer turn ratio and smaller absorber heat capacity can significantly improve energy resolution.

Figure 9:
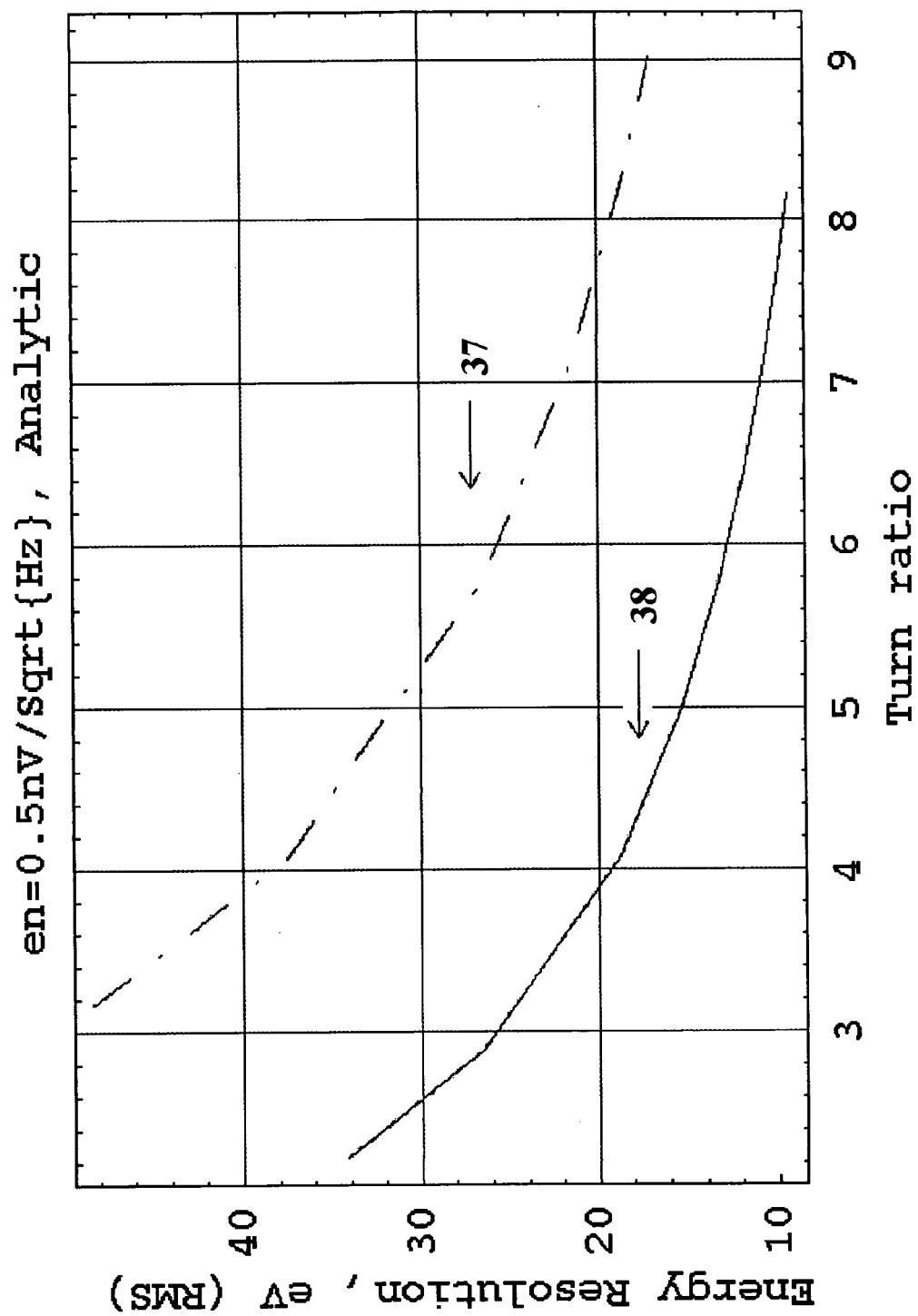
FIG. 9 depicts a calculated noise energy equivalent as a function of the transformer turn ratio obtained via analytic expression. Two TES readout configurations with identical resonance frequencies and different characteristic impedance of resonance circuits are analyzed. The readout circuit parameters are the same as for the results shown in FIG. 8 with an exception of demodulated signal filter (see the main text).

FIG. 9 shows energy equivalent of electronic noise in function of the transformer turn ratio calculated via expression 46 with the detector parameters taken from Table I and circuit parameters used in numerical simulations that supplied results shown in FIG. 8. The upper and lower curves in FIG. 8 have matching circuit parameters with the upper and lower curves in FIG. 9, i.e. circuit parameters of curves 35, 36 in FIG. 8 match the parameters of curves 37, 38 in FIG. 9. However, simulation uses the second order filter for the demodulated signal, while analytic calculation uses the first order filter with the same time constant. Second order filter was chosen in simulations to eliminate the carrier feed-through effect in the demodulated signal. Indeed comparison of simulation results in FIGS. 8 and 9 shows that they are very close, provided the difference in demodulated signal frequency band (second order filter instead of first order) and simplified approach in finding peak of the response via expression 45 are taken into account.

Figure 10:
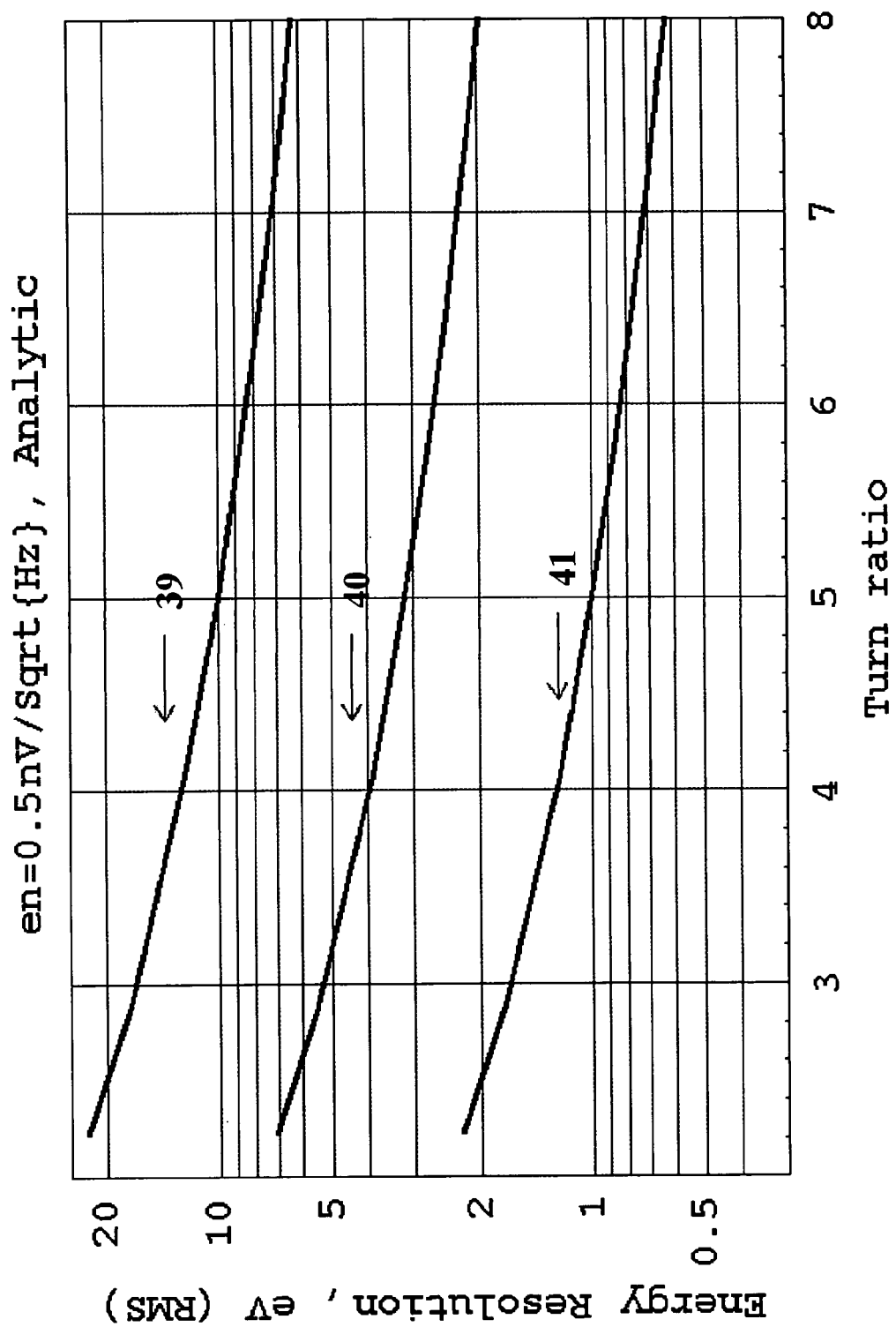
FIG. 10 depicts a calculated noise energy equivalent as a function of the transformer turn ratio for different absorber heat capacities.

For the filter time constant of the demodulated signal that matches TES absorber time constant one may implement expression 51 to estimate energy equivalent of electronic noise. FIG. 10 shows how electronic noise energy equivalent depends on the transformer turn ratio. These plots are obtained via expression 51. TES parameters used are chosen to be the same as in FIGS. 8, 9. The readout circuit parameters are the same as for the curves in FIGS. 8, 9 with higher energy resolution. The detector with parameters listed in Table I is utilized for hard X-ray detection with energies above 60 KeV. If the detector absorber is thinned (for soft X-ray and UV detection) the resolution can be improved significantly. In FIG. 10 energy equivalents of electronic noise for the existing detector 39 are compared with those for the detector that will have ten 40 and one hundred 41 times lower absorber heat capacity. FIG. 10 shows that with thin absorber and realistic readout circuit parameters an energy equivalent of electronic noise can be below 0.6 eV (Root Mean Square).

Sources of fluctuations different from electronic noise that contribute to energy resolution were not examined above. The fundamental limits imposed on the detector resolution may dominate in some applications. The contribution of noise sources related to electric resistance of coils can be made practically insignificant by proper coil design. In front-end realization with discrete components one has to take into account a stray capacitance of the transformer connection to the amplifier input. The resonance formed by the stray capacitance and inductance of secondary coil may limit frequency band.

Appendix A. Time Domain Simulation of Electronic Noise Energy Equivalent

When an analog multiplier is used for the detection of the signal the readout electronic noise can not be simulated directly in frequency domain with SPICE. The reason is intrinsically non-linear nature of the analog multiplier circuit. SPICE simulates noise in frequency domain for linearized circuits only. The conditions for noise analysis in SPICE are obtained from stationary DC bias simulation. To overcome the problem of direct noise simulation in SPICE with an analog multiplier in the circuit the stochastic trains corresponding to series and parallel noises are introduced to describe each of these noises. The known noise spectral densities are referred to the parameters of the stochastic trains. Propagation of the stochastic train through the circuit is then simulated in the time domain with SPICE and noise spectral density at the output is obtained via Campbell theorem Reference 5. Noise power is obtained as an integral of the output noise spectral density.

Consider series electronic noise generator as a dominant noise source. Let us assign a flux of triangular-shape voltage impulses with amplitude $A_1$, base-to-base duration of $2\tau$ and an average number of impulses per unit time $\lambda$ to the stochastic train that represents series noise source. At the output of the circuit (after demodulation and filtering) one will observe stochastic train of voltage impulses with amplitudes $A_2$, the shape of each impulse is defined by a function of time $f_2(t)$, the flux rate of the impulse train is the same as at the input. The noise spectral density given by the stochastic train at the amplifier input is calculated via Campbell theorem as:

$$S(f) = e_n^2 \lambda A_1^2 |F(f_1(t))|^2 = 4\lambda A_1^2 \tau^2 \left(\frac{\sin(\omega\tau)}{\frac{\omega\tau}{2}}\right)^2, \quad (1A)$$

where $F(f_1(t))$ is Fourier transformation of an impulse with triangular shape $f_1(t)$. Factor of 4 reflects the fact that Fourier transformation of triangular impulse in positive frequency domain is considered. By choosing the duration of the triangular impulse small enough the "flat" (white) noise spectral density can be obtained for a wide frequency band as it may be seen from expression 1A. Indeed a decomposition in series of expression 1A to the first order term gives negligible correction to the "flatness" of spectral density at several MHz frequency of AC bias carrier, when $\tau$ is small ($2\tau=20$ ns):

$$e_n^2 = 4\lambda A_1^2 \tau^2 \left(1 - \frac{1}{6}\left(\frac{\omega\tau}{2}\right)^2\right)^2 \cong 4\lambda A_1^2 \tau^2 \quad (2A)$$

The output noise spectral density produced by above noise source is found from Campbell theorem as follows:

$$S(f)_{out} = \lambda A_2^2 |F(f_2(t))|^2 = \lambda |F(A_2 f_2(t))|^2 = \lambda |F(f_{out}(t))|^2, \quad (3A)$$

where $f_{out}(t)$ is the impulse with shape $f_2(t)$ caused by each impulse of the input stochastic train.

Therefore the output signal dispersion given by electronic noise may be represented as follows:

$$\sigma_{out}^2 = \lambda \int_{-\infty}^{\infty} |F(f_{out}(t))|^2 d\omega = \lambda \int_{-\infty}^{\infty} f_{out}^2(t) dt = \frac{e_n^2}{4A_1^2 \tau^2} \int_{-\infty}^{\infty} f_{out}^2(t) dt, \quad (4A)$$

where expression for the flux rate $\lambda$ was substituted from expression 2A. Parseval theorem, that states an equal noise power of an impulse $f_{out}(t)$ in time and frequency domains, is used. From the latter expression the noise induced signal dispersion at the output of the circuit is obtained as a result of time domain simulation of the circuit reaction on stimulus with shape $f_1(t)$. The parameters $A_1$, $e_n$, and $\tau$ are used in simulation. The square of the response should be integrated for sufficiently long time to reduce an error in simulation of the integral in expression 4A to proper values. For a given energy deposition in the detector the response of the circuit is simulated under the same conditions as well. Then energy equivalent of electronic noise at the circuit output is calculated by dividing noise standard deviation to the amplitude of the response at a given input signal. Electronic noise contribution to TES energy resolution is thus simulated without explicit reference to details of demodulation and filtering circuit.

Appendix B. Solving TES Temperature Equations

First system of TES thermal equations 28, 29 may be simplified by using the following guess solutions:

$$\Delta T = B(t)\exp(-t/\tau_e) \quad (1B)$$

$$\Delta T_a = A(t)\exp(-t/\tau_a), \quad (2B)$$

where expressions for $\tau_e$, $\tau_a$ are given in 32, $A(t)$ and $B(t)$ are unknown functions of time so far.

The system 28, 29 is now simplified as follows:

$$\frac{dA(t)}{dt} = \frac{B(t)}{\tau_a} \exp\left[-t\left(\frac{1}{\tau_e} - \frac{1}{\tau_a}\right)\right] \quad (3B)$$

$$\frac{dB(t)}{dt} = \frac{B(t)}{\tau_a} \exp\left[-t\left(\frac{1}{\tau_e} - \frac{1}{\tau_a}\right)\right] \quad (3B)$$

By differentiating expression 3B one more time and using the substitute from expression 4B a differential equation for the function $A(t)$ is obtained:

$$\frac{d^2 A(t)}{dt^2} - \left(\frac{1}{\tau_a} - \frac{1}{\tau_e}\right)\frac{dA(t)}{dt} - \frac{C_{abs}}{C_{tes}\tau_a^2} A(t) = 0 \quad (5B)$$

Similarly by differentiating expression 4B and using the substitute from 3B a differential equation for the function $B(t)$ is obtained $$\frac{d^2 B(t)}{dt^2} + \left(\frac{1}{\tau_a} - \frac{1}{\tau_e}\right)\frac{dB(t)}{dt} - \frac{C_{abs}}{C_{tes}\tau_a^2} B(t) = 0 \quad (6B)$$

Solution of equations 5B, 6B is a standard procedure that results in the following expressions for TES temperatures:

$$\Delta T = B_{01} \exp\left[-t\left(\frac{1}{\tau_0} + \frac{D}{\tau_1}\right)\right] + B_{02} \exp\left[-t\left(\frac{1}{\tau_0} - \frac{D}{\tau_1}\right)\right] \quad (7B)$$

$$\Delta T_a = A_{01} \exp\left[-t\left(\frac{1}{\tau_0} + \frac{D}{\tau_1}\right)\right] + A_{02} \exp\left[-t\left(\frac{1}{\tau_0} - \frac{D}{\tau_1}\right)\right], \quad (8B)$$

where $A_{01}$, $A_{02}$, $B_{01}$, $B_{02}$—constants defined by initial conditions, parameters $\tau_0$, $\tau_1$, $D$ are expressed as follows:

$$D = \sqrt{1 + \frac{4C_{abs}}{C_{tes}\left(\frac{\tau_a}{\tau_e} - 1\right)^2}} \quad (9B)$$

$$\frac{1}{\tau_0} = \frac{1}{2}\left(\frac{1}{\tau_e} + \frac{1}{\tau_a}\right) \quad (10B)$$

$$\frac{1}{\tau_1} = \frac{1}{2}\left(\frac{1}{\tau_e} - \frac{1}{\tau_a}\right) \quad (11B)$$

Initial conditions are defined by instant energy deposition to the absorber that gives relation between constants in 7B, 8B as follows:

$$A_{01} + A_{02} = \frac{\Delta E_0}{C_{abs}} \quad (12B)$$

$$B_{01} + B_{02} = 0 \quad (13B)$$

Additional relations may be found by substituting solutions 7B, 8B into equations 3B, 4B at zero time:

$$\frac{dA}{dt}\bigg|_{t=0} = \frac{B(0)}{\tau_a} \quad (14B)$$

$$\frac{dB}{dt}\bigg|_{t=0} = \frac{C_{abs}}{C_{tes}}\frac{A(0)}{\tau_a} \quad (15B)$$

From expressions 12B–15B these constants in TES temperatures solution are unambiguously defined as:

$$A_{01} = \frac{\Delta E_0}{2C_{abs}}\left(1 - \frac{1}{D}\right) \quad (16B)$$

$$A_{02} = \frac{\Delta E_0}{2C_{abs}}\left(1 + \frac{1}{D}\right) \quad (17B)$$

$$B_{01} = -\frac{\tau_1}{2\tau_a D}\frac{\Delta E_0}{C_{tes}} \quad (18B)$$

$$B_{02} = \frac{\tau_1}{2\tau_a D}\frac{\Delta E_0}{C_{tes}} \quad (19B)$$

Final representation for TES temperatures responses is given in expressions 30, 31 of the main text.

REFERENCES

1. M. F. Cunningham, et al., High-resolution operation of frequency-multiplexed transition-edge photon sensors, Applied Physics Letters, Vol. 81, No. 1, pp. 159–161, July 2002.
2. K. D. Irwin, SQUID multiplexers for transition-edge sensors, Physica C, Vol. 368, pp. 203–210, 2002.
3. D. T. Chow, Superconducting High Energy Resolution Gamma-ray Spectrometers, Ph.D. Dissertation, UCRL-LR-147515, LLNL, Feb. 22, 2002.
4. T. Miyazaki, et al., Performance analysis of gamma-ray TES microcalorimeters with demonstrated energy resolution of 52 eV at 60 KeV, IEEE Trans. on Nucl. Sci. 13 (2) (2003) 626.
5. N. R. Campbell, Proc. of Cambridge Philos. Soc. 15 (1909), 117.

TABLE I

| Normalization resistance | Lead resistance | TES cold resistance | Transition temperature | Transition width |
|---|---|---|---|---|
| $R_N$ | $R_I$ | $R_C$ | $T_C$ | $\Delta T_C$ |
| 360 mΩ | 10 mΩ | 5 mΩ | 122 mK | 3 mK |
| Absorber thermal conductance | Absorber heat capacity | TES electron heat capacity | Thermal conductance to cryostat | Thermal conductance power |
| Gabs | $C_{abs}$ | $C_{tes}$ | K | N |
| $1.01 \times 10^{-8}$ | $9.57 \times 10^{-12}$ | $9.92 \times 10^{-13}$ | $60.2 \times 10^{-9}$ | 3.417 |
| J/Ks | J/K | J/K | J/K$^N$ | |

I claim:

1. An apparatus for radiation detection comprising:
   a transition edge sensor (TES) resistive element connected in series with an electric capacitor and a primary coil of a transformer, forming a resonance loop circuit, and
   a secondary coil of the transformer electromagnetically coupled with the coil of the resonance loop circuit connected in series to an electronic circuit composed of an alternating current (AC) generator generating a carrier at resonance frequency of the primary loop circuit and a current-to-voltage converter that comprises a low noise amplifier and a high impedance element connected as the amplifier negative feedback.

2. An apparatus as described in claim 1 further comprising a demodulator connected to the current-to-voltage converter output and low pass filter circuits connected to the demodulator output to recover TES electric resistance variations from the carrier signal coming from current-to-voltage converter.

3. An apparatus as described in claim 1 further comprising large arrays of TES where the TES detectors are assembled in an array operating in thermal isolation from warm readout electronics.

4. An apparatus as described in claim 1 further comprising means for spectrometry and imaging capabilities.

5. A method of detecting radiation comprising:
   transferring the signal induced in a TES resistive element to a TES readout output via electromagnetic coupling of transformer coils, and
   transferring the AC carrier amplitude to the TES resistive element using the electromagnetic coupling of the transformer coils of the transformer used in the TES induced signal transfer.

6. A method of detecting radiation as described in claim 5 further comprising controlling the TES operational conditions from a warm part of TES readout circuit via variation of an AC carrier amplitude and frequency through the electric circuit used to read signals induced in the TES resistive element.

7. A method as described in claim 5 further comprising transferring of electric power generated in a warm AC carrier generator to the TES via electromagnetic coupling between transformer coils of the readout that are used as signal transfer coils.

8. A method as described in claim 5 further comprising minimization of electric power dissipated in a cold part of TES readout circuitry and associated thermal noise by complete exclusion of extra wiring necessary for maintaining TES operational conditions with an AC carrier generator.

9. A method as described in claim 5 further comprising obtaining the energy resolution of a TES microcalorimeter of less than 10 eV using the warm readout circuit.

* * * * *